G. HAVELL.

BOOK, SHAWL OR PARCEL HANDLES.

No. 7,778. Reissued July 3, 1877.

WITNESSES

Henry N. Miller

Frank Gall

INVENTOR

George Havell.

Chauncey Mason

ATTORNEYS

N. PETERS, PHOTO-LITHOGRAPHER, WASHINGTON, D. C.

UNITED STATES PATENT OFFICE

GEORGE HAVELL, OF NEWARK, NEW JERSEY.

IMPROVEMENT IN BOOK, SHAWL, OR PARCEL HANDLES.

Specification forming part of Letters Patent No. 183,563, dated October 24, 1876; Reissue No. 7,778, dated July 3, 1877; application filed June 13, 1877.

*To all whom it may concern:*

Be it known that I, GEORGE HAVELL, of the city of Newark, in the county of Essex and State of New Jersey, have invented certain new and useful Improvements in Satchel and Traveling-Bag Handles; and I do hereby declare that the following is a full, clear, and exact description thereof, reference being had to the accompanying drawings, and to the letters of reference marked thereon, which form a part of this specification.

The nature of my invention consists of a new and improved form of handle to be used in carrying parcels, &c., which is neat, cheap, light, and strong.

All the handles in use for analogous purposes may be divided into two classes—those in which only two straps are used, and those in which three straps are used. In the latter form, as usually made, the middle loop, through which the strap is passed, is riveted on a bar of metal, strap of leather, or other material, this bar or strap extending from one end of the handle to the other. The object of this mode of construction is to secure strength and firmness; but said bar forms no part of the handle proper. In my improved form of handle I dispense with the said bar entirely.

In order to enable others skilled in the art to which my invention appertains to make and use the same, I will now proceed to describe its construction and operation, referring to the annexed drawing, in which—

Figure 1:
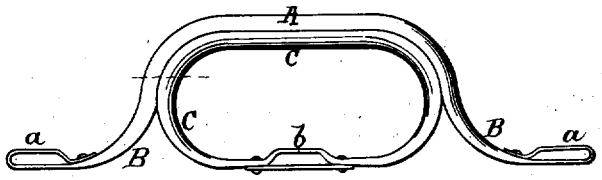
Figure 2:
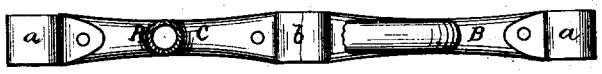

Figure 1 is a side view of a handle embodying my invention. Fig. 2 is a plan view, partly in section, of the same.

A represents the body of the handle, of sheet metal, and having its ends forming the projecting feet B B, each of which has a loop, *a*, formed on it for the passage of the two straps.

C represents a loop, of sheet metal, depending from the main portion of the handle A. In the center of the bottom part of said suspended loop C is formed a small loop, *b*, for the passage of the center strap. By the use of this loop suspended from the handle I dispense with the cross-bar heretofore employed, and the handle becomes materially strengthened.

Having thus fully described my invention, what I claim as new, and desire to secure by Letters Patent, is—

1. In a handle for carrying books, shawls, or parcels, a pendent loop attached to and forming a part of such handle, substantially as and for the purposes set forth.

2. A pendent loop projecting from and within a handle, and forming a part of such handle, for carrying shawls, books, or parcels, for the purposes herein set forth.

In testimony that I claim the foregoing I have hereunto set my hand this 4th day of June, 1877.

GEORGE HAVELL.

Witnesses:

H. A. KINGSLEY,

JOHN OTTO.